Dec. 5, 1939.  H. M. GERSMAN  2,182,430
EXTERNAL COMBUSTION ENGINE
Filed May 24, 1935  4 Sheets-Sheet 1
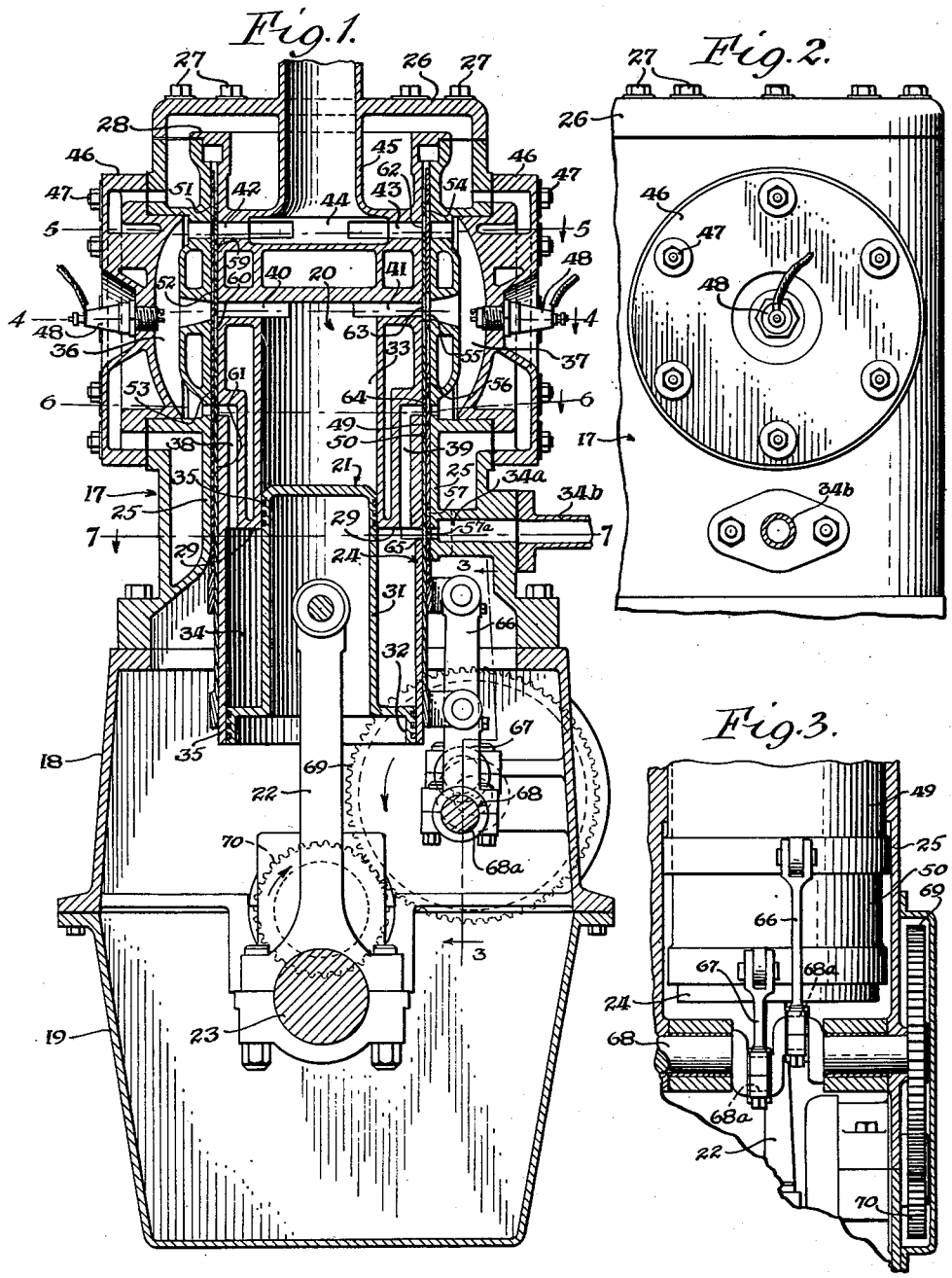
Inventor
Harvey M. Gersman
by John S. Powers
Attorney Dec. 5, 1939.   H. M. GERSMAN   2,182,430
EXTERNAL COMBUSTION ENGINE
Filed May 24, 1935
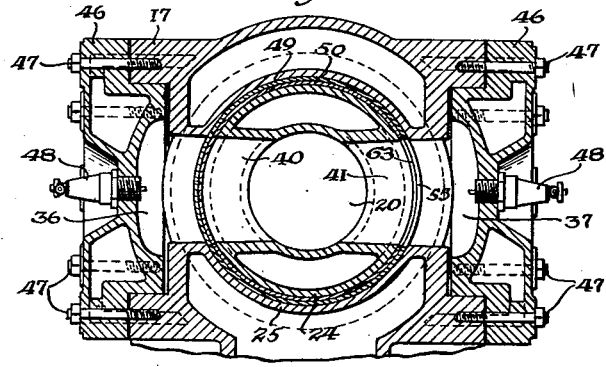
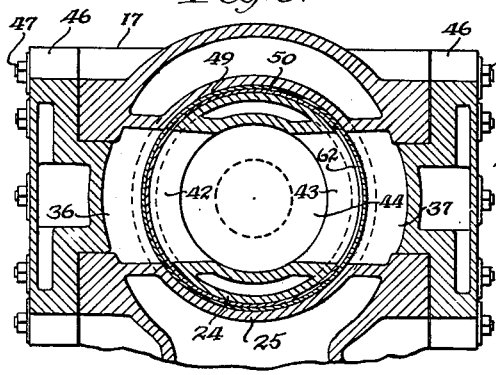
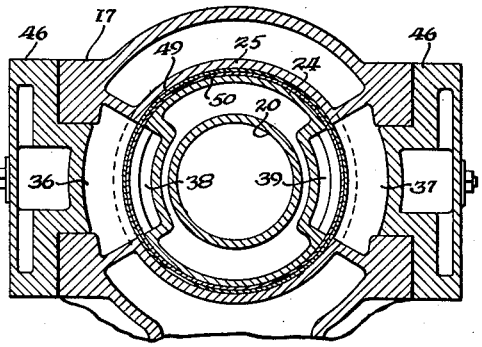
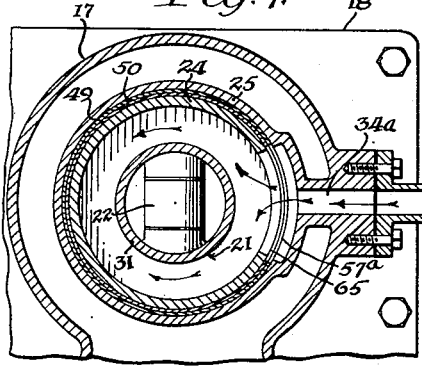
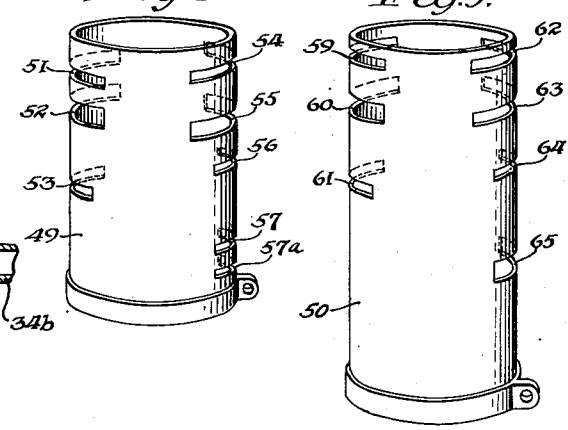
Inventor
Harvey M. Gersman
by John S. Powers
Attorney Dec. 5, 1939.  H. M. GERSMAN  2,182,430
EXTERNAL COMBUSTION ENGINE
Filed May 24, 1935  4 Sheets-Sheet 3
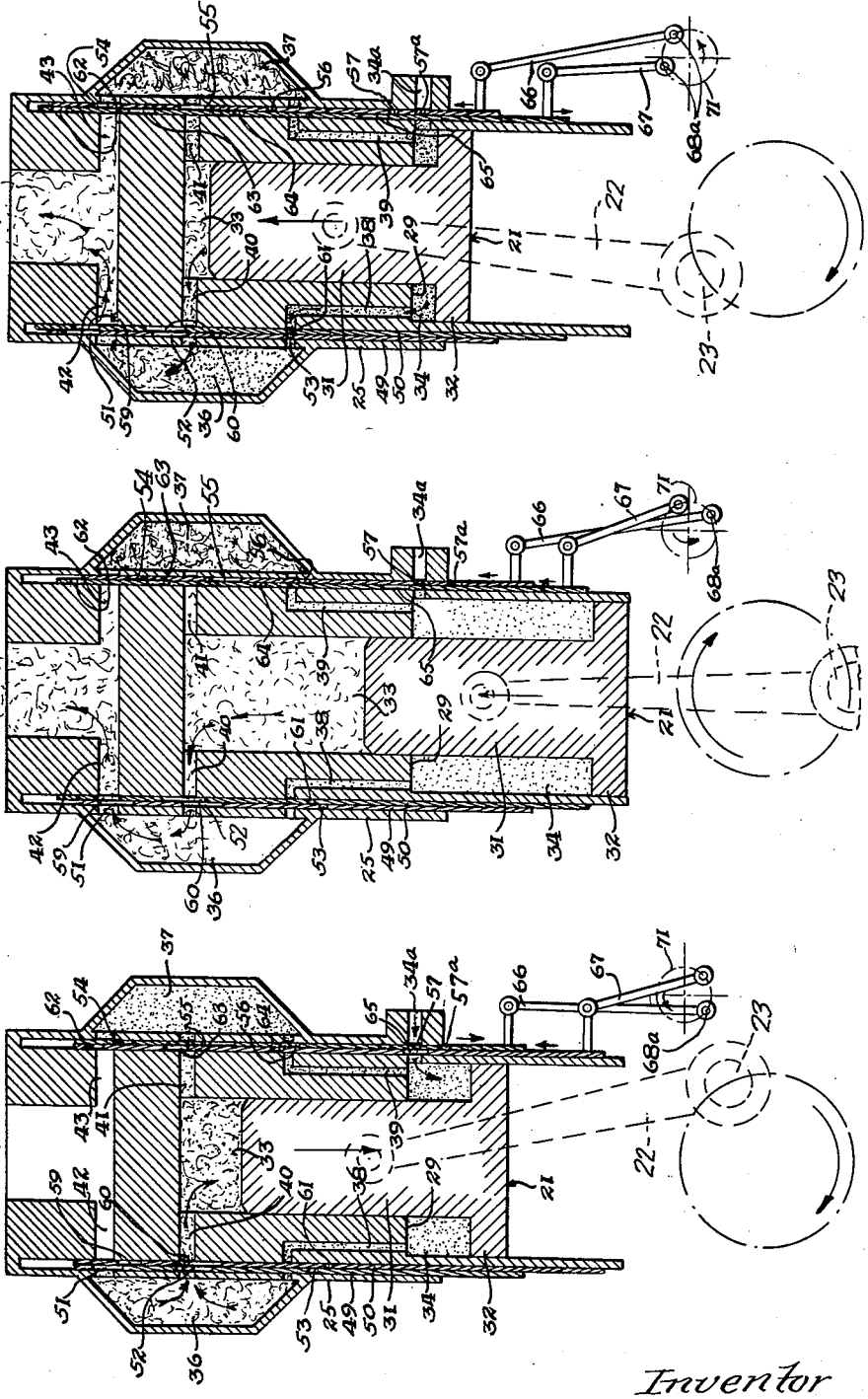
Inventor
Harvey M. Gersman
by John S. Powers
Attorney

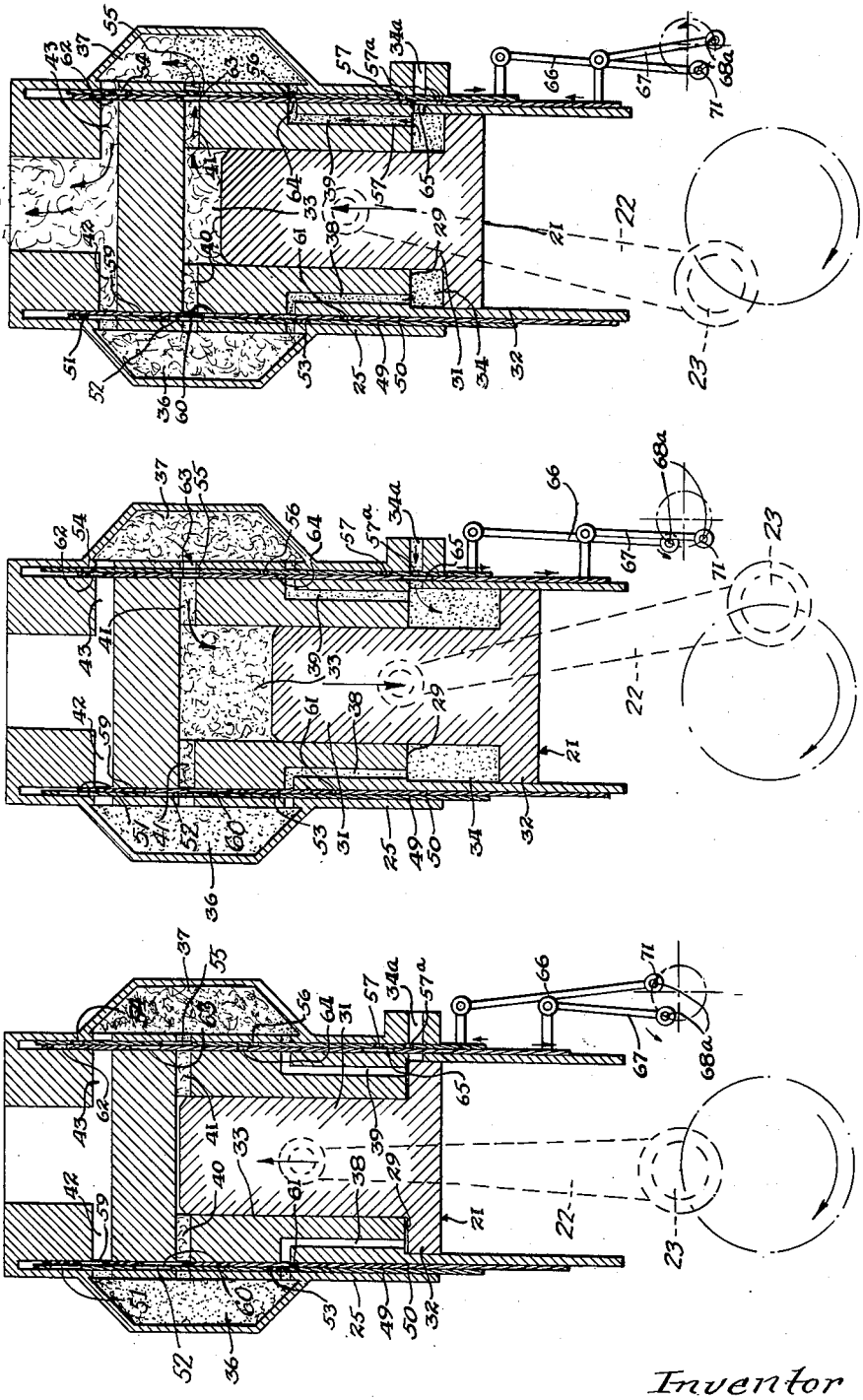

Patented Dec. 5, 1939

2,182,430

UNITED STATES PATENT OFFICE 2,182,430

EXTERNAL COMBUSTION ENGINE

Harvey M. Gersman, New York, N. Y.

Application May 24, 1935, Serial No. 23,270

4 Claims. (Cl. 60—44)

This invention relates to external combustion engines. It contemplates an engine, wherein with respect to a particular cylinder, power is transmitted to the crank shaft once during each revolution and this characteristic is combined with the utilization of a full stroke of the piston for each of the four fundamental operations involved in the use of the motive fluid, namely drawing a charge of the fluid into the engine, compressing it, transmitting to the crank shaft the energy derived from combustion of the charge and exhausting the dissipated or spent gases. In other words the engine is similar to an engine of the two-cycle type in that every second stroke of the piston (i. e. the succeeding strokes in the same direction) is a power stroke and is similar to an engine of the four cycle type in that a full piston stroke is utilized for each of the operations involved in the use of the motive fluid. It will be apparent, therefore, that the power impulses will be rapid, viz., twice the rate of a conventional four-cycle engine of the same number of cylinders and that the desired power and running smoothness can be obtained at an engine speed well below the rate at which excessive wearing and vibration occur, the utilization of a full piston stroke for each of the operations involved in the use of the motive fluid having the advantage that the engine has a wide speed range and is economical from a standpoint of fuel consumption.

A further object is to provide an engine having the characteristics generally described in which complete combustion of the motive fluid is attained at a time which will enable the power derived therefrom to be fully utilized.

A further object is an engine in which combustion of the motive fluid is effected at a constant volume, this object contemplating an engine having combustion chambers which are independent of the expansion chambers and in which the motive fluid is ignited while in a compressed state prior to its admission to the expansion chambers.

A still further object is an engine in which provision is made for preventing, to a substantial degree, heating of the motive fluid as it is drawn into the engine during the intake or suction strokes of the pistons, whereby to insure a high efficiency in the respect that larger charges of motive fluid are admitted to the cylinders than would otherwise be possible without the use of a supercharger or equivalent device.

A still further object is to provide an engine in which the time available for the combustion of the motive fluid is independent of the speed of the engine, this having the advantage that the engine can be designed to operate at the desired speed, and with equal efficiency, with motive fluids having varying combustion characteristics.

A still further object is to provide an engine in which the bore of the expansion chambers and the stroke of the pistons may be predetermined independently of the volume of the charge of motive fluid required and solely with reference to the manner in which the developed power is to be transmitted to the crank shaft.

A still further object is an engine in which provision is made for introducing the motive fluid into the combustion chambers under a predetermined pressure, this having the advantage that the volume of motive fluid which is introduced into the combustion chambers may be predetermined to meet the requirements of the particular engine.

A still further object is to provide a novel design and arrangement of parts, whereby simplicity and economy in construction are obtained.

The invention is illustrated in the accompanying drawings, in which:

Figure 1 is a vertical section through an engine in which features of the invention are incorporated.

Figure 2 is a fragmentary view in elevation of the engine casing.

Figure 3 is a fragmentary section and is taken along line 3—3 of Figure 1.

Figure 4 is a fragmentary horizontal section taken along line 4—4 of Figure 1.

Figure 5 is a similar section along line 5—5 of Figure 1.

Figures 6 and 7 are fragmentary horizontal sections taken along lines 6—6 and 7—7 respectively of Figure 1.

Figure 8 is a perspective view of one of the sleeve valves.

Figure 9 is a similar view of the companion valve.

Figures 10 through 15 inclusive illustrate diagrammatically different positions of the sleeve valves of a cylinder during two revolutions of the crank shaft.

The engine, as illustrated, includes a casing 17 and upper and lower crank case sections 18 and 19, respectively. The casing is formed to accommodate the desired number of cylinders 20, the pistons 21 thereof being connected by connecting rods 22 to a main crank shaft 23. Preferably the cylinders are provided by tubular units 24 which are arranged in cylindrical housings 25 formed or provided in the casing 17, each of the said units having a head 26 which is secured by suitable bolt fastenings 27 to the top of the casing and an internal cap-piece 28 which fits against the top of its housing.

In accordance with the invention the upper part of the cylinder 20 is substantially smaller in diameter than that of the lower part, the wall of the upper part of the unit 24 being of a suitably greater thickness and providing an annular shoulder 29 at the juncture of the two parts of the cylinder. The piston 21 includes heads 31 and 32, the former fitting in the reduced part of the cylinder and co-operating with the walls thereof to provide an expansion chamber 33 and the latter fitting in the larger part of the cylinder and co-operating with the walls thereof to provide a compression chamber 34. The heads of the piston 21 preferably carry suitable rings 35 for sealing the respective chambers. The chamber 34 communicates with a duct 34a which in turn communicates with a branch 34b of a suitable intake manifold. Combustion chambers 36 and 37 are located at opposite sides of the cylinder 20. They communicate with the compression chamber 34 through ducts 38 and 39, respectively; they communicate with the expansion chamber 33 through ducts 40 and 41, respectively; and they communicate through ducts 42 and 43, respectively with an exhaust chamber 44 which is formed or provided at the top of the unit 24 and which communicates through a conduit 45 with a suitable exhaust manifold (not shown). The combustion chambers 36 and 37 include removable heads 46 which are secured to the casing 17 by suitable nut and bolt fastenings 47, the said heads carrying spark plugs 48 which are included in the ignition system of the engine.

Suitable means is provided for controlling the various ducts referred to. The said means, as illustrated, includes outer and inner concentric sleeves 49 and 50, respectively. The sleeves surround the unit 24 and fit between the latter and the housing 25, it being noted that the unit 24 is suitably spaced from the inner wall of the housing to provide a chamber of annular cross section for accommodating the two sleeves. The outer sleeve 49 is formed at one side with ports 51, 52 and 53 and at the opposite side with ports 54, 55, 56, 57 and 57a. The inner sleeve 50 is provided at one side with ports 59, 60 and 61 and at the opposite side with ports 62, 63, 64 and 65. The sleeves 49 and 50 are connected by connecting rods 66 and 67, respectively, to the crank pins 68a of an auxiliary crank shaft 68. The latter is driven from the main crank shaft 23 through the medium of gears 69 and 70, whereby to cause reciprocation of the sleeves in the desired timed relation with respect to the movement of the piston 21.

The invention contemplates the application of power to the main crank shaft once during each revolution and to this end the combustion chambers 36 and 37 act in alteration. Thus, for example, when combustion has taken place in the chamber 36 and the piston is at the top limit of its range of movement the inner sleeve 50 is moving upwardly while the outer sleeve 49 is moving downwardly and the ports 52 and 60 register with the duct 40. The gases of combustion are, therefore, permitted to enter the expansion chamber 33 to move the piston 21 downwardly as indicated in Figure 10, the relative positions of the crank pins 68a and their path of movement being indicated by the line 71. At this time the ports 55 and 63, through which the expansion chamber communicates with the combustion chamber 37, are closed. The ports 57 and 65, however, register with the duct 34a and a charge of the motive fluid is drawn into the compression chamber 34. As the piston approaches the lower limit of its range of movement the ports 57 and 65 move out of registration with the duct 34a to cut off communication between the compression chamber and the intake manifold, the outer sleeve 49 reaching the lower limit of its range of movement and moving upwardly and the inner sleeve 50 continuing to move upwardly during such movement of the piston. As the piston 21 starts to move upwardly, as indicated in Figure 11, the ports 52 and 60 still register with the duct 40 while the ports 51 and 59 register with the duct 42. Hence the dissipated or spent exhaust gases are permitted to pass through the latter to the exhaust manifold. During this upward movement of the piston 21 the charge of motive fluid which was drawn into the chamber 34 during the downward movement of the piston is compressed. When the piston reaches the position shown in Figure 12, that is to say substantially 25° from the top of its stroke, the outer sleeve 49 is still moving upwardly while the inner sleeve 50 has started to move downwardly and the ports 53 and 61 register with the duct 38. The compressed charge of motive fluid in the chamber 34 is, therefore, permitted to enter the combustion chamber 36. At the same time, the ports 52 and 60 move out of registration with the duct 40, thereby cutting off communication between the expansion chamber 33 and the combustion chamber 36. Any small amount of exhaust gases which may remain in the expansion chamber enters, and is compressed in, the ducts 40 and 41. When the compressed charge of motive fluid is admitted to the combustion chamber 36 as described, the ports 51 and 59 still partially register with the duct 42. Hence the motive fluid forces out any exhaust gases remaining in the combustion chamber, the ports 51 and 59 moving immediately thereafter out of registration with the duct 42 to cause the compressed charge of motive fluid to be confined within the combustion chamber 36.

When the piston 21 reaches the upward limit of its range of movement, as illustrated in Figure 13, the ports 53 and 61 move out of registration with the duct 38, thereby completely closing the combustion chamber 36. At this time the sleeve 49 is still moving upwardly while the sleeve 50 is still moving downwardly. They confined the compressed charge of motive fluid in the chamber 36 throughout the succeeding revolution of the crank shaft 23, that is to say during the following downward and return strokes of the piston 21. The ignition system is so timed that at any desired moment during such succeeding revolution of the crank shaft 23 the motive fluid is ignited, whereby during the interval that the crank shaft is completing the revolution combustion of the motive fluid is effected. The adjustment of the ignition system is predetermined with reference to the period of time required for complete combustion. In other words ignition of the motive fluid is effected at a period during the revolution of the crank shaft which will be adequate to insure complete combustion of the motive fluid by the time that the revolution is completed, that is to say, by the time that the piston has again reached the top limit of its range of movement and the ports 52 and 60 are again moved into registration with the duct 40.

It will be apparent from the foregoing that the crank shaft 23 makes one complete revolution during the downward and return strokes of the piston 21 illustrated in Figures 10 through 13, the charge of motive fluid being introduced into the chamber 36 during the return stroke of the piston. During this revolution of the crank shaft 23, a charge of motive fluid which has been introduced into the chamber 37 during the preceeding revolution has been ignited, the ignition of the charge being so timed that combustion is completed as the piston 21 reaches the top limit of its range of movement. As the piston reaches this limit, the ports 55 and 63 are moved to register with the duct 41 and ports 57a and 65 register with the duct 34a. Hence combustion gases from the chamber 37 are admitted to the expansion chamber 33 to apply power to the piston 21. The latter is thus moved downwardly, as indicated in Figure 14, the said poston drawing a fresh charge of motive fluid into the compression chamber 34 while the sleeves 49 and 50 are both moving downwardly.

As the piston 21 approaches the lower limit of its range of movement the sleeves 49 and 50 close the duct 34a, the ports 55 and 63 and 54 and 62 registering with the ducts 41 and 43, respectively, while the duct 39 is closed. Hence as the piston moves upwardly the dissipated or spent gases of combustion escape from the expansion chamber 33 and pass through the duct 43 to the exhaust manifold. During such upward movement of the piston, the charge of motive fluid drawn into the compression chamber 34 during the downward movement of the piston is compressed and as the piston reaches the position indicated in Figure 15, that is to say substantially twenty-five degrees from the top limit of its stroke the sleeve 49 is moving downwardly while the sleeve 50 has just started to move upwardly and the ports 56 and 64 register with the duct 39. The compressed charge of motive fluid is thereupon permitted to enter the combustion chamber 37, the ports 55 and 63 closing to cut off communication between the combustion chamber and the expansion chamber while ports 43 and 54 remain in registration momentarily with the duct 43 to permit the compressed charge of motive fluid to clear the combustion chamber of any remaining gases of combustion. During the two piston strokes just described, that is to say the downward and upward strokes illustrated in Figures 14 and 15 respectively, the compressed charge of motive fluid in the combustion chamber 36 has been ignited, the ignition being so timed that as the piston approaches the top limit of its range of movement combustion has been completed. Hence, as the piston 21 reaches the top limit of its range of movement, the sleeves 49 and 50 move the ports 52 and 60 into registration with the duct 40 and the ports 57a and 65 move into registration with the duct 34a. The cycle of operations described is, therefore, begun anew as the gases of combustion from the combustion chamber 36 are admitted to the expansion chamber 33 to move the piston 21 downwardly.

The construction described has the advantage that the total power generated by each charge of motive fluid is applied to the piston during the initial and most effective part of its working stroke. In this connection it will be noted that the bore of the expansion chamber and the stroke of the piston may be predetermined independently of the volume of motive fluid required for each charge and solely with reference to the application of the power to the crank shaft. Moreover as the expansion and compression chambers are independent of one another the latter can be designed solely with reference to the volume of the charge which is to be introduced in the combustion chambers. In other words the compression chamber 34 serves the same purpose as a supercharger. It is adapted to introduce the motive fluid into the combustion chambers in charges of a predetermined volume and is also available to introduce air into the said chambers in increased amounts so as to compensate for decreases in the density of the atmosphere. For example, if the engine is to be employed to power aeroplanes and similar machines, and especially those which are intended to fly at high altitudes, the compression chamber may be designed to introduce air into the cylinder in volumes which will provide the necessary amount of oxygen, it being understood that in such a case the compression chamber is designed so that it is capable of taking in, at normal atmospheric densities (low altitudes), a much greater volume of air than is required, whereby at higher altitudes the air throttle of the carburetor may be opened further to increase correspondingly the volume of air introduced into the cylinders and thereby compensate for the lower density of the atmosphere. A compression chamber of this character may also, if desired, be used in connection with engines for various other purposes and is adapted, in such cases, to provide reserve or additional power which is available when required.

It will be noted that the compression chamber is independent of the combustion chambers. Its walls, therefore, remain at a much lower temperature than those of the latter and as the motive fluid which is introduced in the compression chamber remains at a correspondingly low temperature, it expands to only a relatively small degree. Hence larger charges of motive fluid can be introduced into the combustion chambers than would otherwise be possible. The power of the engine is thus further increased.

I claim as my invention:

1. In an engine of the character described, the combination with a cylinder having an expansion chamber, a compression chamber and a piston which is connected to the crank shaft of the engine and which is movable in both of said chambers, of at least two combustion chambers which communicate with said expansion chamber, said piston being operative during successive movements in one direction to draw charges of motive fluid into said compression chamber and being operative during successive movements in the opposite direction to compress said charges, valve means for directing said charges of motive fluid alternately to said combustion chambers during compression strokes of said piston and means for igniting the charges of motive fluid in said combustion chambers, said valve means cutting off communication between said combustion and expansion chambers during combustion of said charges of motive fluid, whereby to effect combustion of said motive fluid in said chambers at substantially constant volume and being operative to admit the gas generated in one of said combustion chambers to said expansion chamber as said piston starts a working stroke and to admit the gases generated in the other of said combustion chambers to said expansion chamber as said piston starts a succeeding working stroke, said piston being operative to exhaust said expansion chamber through one of said combustion chambers during each compression stroke, said valve means being adjusted to admit a compressed charge of motive fluid to the combustion chamber which is being exhausted as the piston approaches the limit of a compressing and exhausting stroke.

2. In an engine of the character described, the combination with a cylinder having an expansion chamber of one bore, a compression chamber of a larger bore and a piston which is connected to the crank shaft of the engine, said piston having heads which are movable in said chambers, of at least two combustion chambers, ports through which said combustion chambers communicate with said expansion chamber, said piston being operative during successive movements in one direction to draw charges of motive fluid into said compression chamber and being operative during successive movements in the opposite direction to compress said charges while exhausting said expansion chamber, valve means for directing said charges of motive fluid alternately to said combustion chambers during compression strokes of said piston and for permitting the escape through said ports of the spent gases from said expansion chamber and means for igniting the charges of motive fluid in said combustion chambers, said valve means cutting off communication between said combustion and expansion chambers during combustion of said charges of motive fluid, whereby to effect combustion of said motive fluid in said combustion chambers at substantially constant volume and being operative to admit the gases generated in one of said combustion chambers to said expansion chamber as said piston starts a working stroke and to admit the gases generated in the other of said combustion chambers to said expansion chamber as said piston starts a succeeding working stroke, said piston exhausting said expansion chamber through one of said combustion chambers during each compression stroke, said valve means being adjusted to admit a compressed charge of motive fluid to the combustion chamber which is being exhausted as the piston approaches the limit of a compressing and exhausting stroke.

3. In an engine of the character described, the combination with a cylinder having an expansion chamber, a compression chamber and a piston which is connected to the crank shaft of the engine and which is movable in both of said chambers, of at least two combustion chambers, ports through which said combustion chambers communicate with said expansion chamber, said piston being operative during successive movements in one direction to draw charges of motive fluid into said compression chamber and being operative during successive movements in the opposite direction to compress said charges while exhausting said expansion chamber, cooperating concentric sleeve valves for directing said charges of motive fluid alternately to said combustion chambers during compression strokes of said piston and for permitting the escape through said ports of the spent gases from said expansion chamber and means for igniting the charges of motive fluid in said combustion chambers, said valves cutting off communication between said combustion and expansion chambers during combustion of said charges of motive fluid, whereby to effect combustion of the motive fluid in said combustion chambers at substantially constant volume and being operative to admit the gases generated in one of said combustion chambers to said expansion chamber as said piston starts a working stroke and to admit the gases generated in the other of said combustion chambers to said expansion chamber as said piston starts a succeeding working stroke, said sleeve valves being operative to admit a compressed charge of motive fluid to the combustion chamber which is being exhausted as the piston approaches the limit of its compressing and exhausting stroke period.

4. In an engine of the character described, the combination with a cylinder having an expansion chamber of one bore, a compression chamber of a larger bore and a piston which is connected to the crank shaft of the engine, said piston having heads which are movable in said chambers, of at least two combustion chambers, ports through which said combustion chambers communicate with said expansion chamber, said piston being operative during successive movements in one direction to draw charges of motive fluid into said compression chamber and being operative during successive movements in the opposite direction to compress said charges while exhausting said expansion chamber, cooperating concentric sleeve valves for directing said charges of motive fluid alternately to said combustion chambers during compression strokes of said piston and for permitting the escape through said ports of the spent gases from said expansion chamber and means for igniting the charges of motive fluid in said combustion chambers, said valves cutting off communication between said combustion and expansion chambers during combustion of said charges of motive fluid, whereby to effect combustion of the motive fluid in said combustion chambers at substantially constant volume and being operative to admit the gases generated in one of said combustion chambers to said expansion chamber as said piston starts a working stroke and to admit the gases generated in the other of said combustion chambers to said expansion chamber as said piston starts a succeeding working stroke, said piston exhausting said expansion chamber through one of said combustion chambers during each compression stroke, said valve means being adjusted to admit a compressed charge of motive fluid to the combustion chamber which is being exhausted as the piston approaches the limit of its compressing and exhausting stroke.

HARVEY M. GERSMAN.